United States Patent
Choy et al.

(10) Patent No.: US 6,786,957 B2
(45) Date of Patent: Sep. 7, 2004

(54) AQUEOUS INK-JET INKS FOR PRINTING ON COMMERCIAL OFFSET COATED MEDIA

(75) Inventors: Mark L. Choy, San Diego, CA (US); John R Moffatt, Corvallis, OR (US); Joseph W Tsang, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/056,556

(22) Filed: Jan. 22, 2002

(65) Prior Publication Data

US 2003/0150355 A1 Aug. 14, 2003

(51) Int. Cl.[7] .............................................. C09D 11/02
(52) U.S. Cl. ........................... 106/31.57; 106/31.43; 106/31.59; 106/31.85; 106/31.75; 106/31.89
(58) Field of Search ................ 106/31.57, 31.43, 106/31.59, 31.85, 31.75, 31.89

(56) References Cited

U.S. PATENT DOCUMENTS

| | | | |
|---|---|---|---|
| 4,767,466 A | 8/1988 | Nemeh et al. ............ 106/487 |
| 5,221,334 A | 6/1993 | Ma et al. .................. 106/20 D |
| 5,356,464 A | 10/1994 | Hickman et al. ......... 106/20 R |
| 5,389,133 A | 2/1995 | Gundlach et al. |
| 5,395,431 A | 3/1995 | Siddiqui et al. .......... 106/20 R |
| 5,554,213 A | 9/1996 | Radigan, Jr. et al. |
| 5,658,376 A | 8/1997 | Noguchi et al. .......... 106/31.43 |
| 5,709,737 A | 1/1998 | Malhotra et al. ......... 106/31.43 |
| 5,786,410 A * | 7/1998 | Foucher et al. ............ 523/161 |
| 5,830,267 A * | 11/1998 | Zambounis et al. ........ 106/413 |
| 5,852,075 A | 12/1998 | Held .......................... 523/161 |
| 5,868,822 A | 2/1999 | Yui et al. .................. 106/31.26 |
| 5,876,491 A | 3/1999 | Gunn et al. ............... 106/31.46 |
| 5,883,157 A | 3/1999 | Yamashita et al. .......... 532/161 |
| 5,973,026 A | 10/1999 | Burns et al. |
| 6,087,416 A | 7/2000 | Pearlstine et al. .......... 523/160 |
| 6,310,115 B1 | 10/2001 | Vanmaele |
| 6,379,443 B1 * | 4/2002 | Komatsu et al. ......... 106/31.58 |
| 2002/0195022 A1 * | 12/2002 | Moffatt et al. ............. 106/31.8 |

FOREIGN PATENT DOCUMENTS

| | | | |
|---|---|---|---|
| EP | 0882771 A2 | 12/1998 | ........... C09D/11/01 |
| EP | 0882771 A3 | 4/1999 | ........... C09D/11/01 |
| EP | 0909798 A1 | 4/1999 | ........... C09D/11/02 |
| EP | 1103585 A1 | 5/2001 | |

* cited by examiner

*Primary Examiner*—Mark L. Bell
*Assistant Examiner*—Veronica F. Faison

(57) ABSTRACT

An aqueous ink-jet ink composition for printing on offset media is disclosed comprising an ink colorant, an effective amount of at least one surfactant, and an effective amount of at least one aprotic polar solvent wherein the solvent is comprised of molecules having a molecular weight from 40 to 1500. Optionally, an effective amount of a non-aprotic polar solvent can be added. The aqueous ink-jet inks of the present invention are effective for printing on many commercially available offset papers and other media.

24 Claims, No Drawings

AQUEOUS INK-JET INKS FOR PRINTING ON COMMERCIAL OFFSET COATED MEDIA

FIELD OF THE INVENTION

The present invention is directed to aqueous ink-jet compositions for printing on commercial offset coated media.

BACKGROUND OF THE INVENTION

In recent years, computer printer technology has evolved to a point where very high resolution images can be transferred to various media. One particular type of printing involves the placement of small drops of a fluid ink onto a surface in response to a digital signal. Typically, the fluid ink is placed or jetted onto the surface without physical contact between the printing device and the surface. The method that the ink is deposited onto the printing surface varies from system to system. However, two major systems include continuous ink deposit and drop-on-demand ink deposit.

With regard to continuous printing systems, inks used are typically based on solvents such as methyl ethyl ketone and ethanol. Essentially, continuous printing systems function as a stream of ink droplets are ejected and directed by printer nozzle. The ink droplets are directed additionally with the assistance of an electrostatic charging device in close proximity to the nozzle. If the ink is not used on the desired printing surface, the ink is recycled for later use. Regarding drop-on-demand printing systems, the ink-jet inks are typically based upon water and glycols. Essentially, with these systems, ink droplets are propelled from a nozzle by heat or by a pressure wave. Additionally, all of the ink droplets are used to form the printed image and are ejected when needed.

There are several reasons that ink-jet printing has become a popular way of recording images on various media, particularly paper. Some of these reasons include low noise, capability of high speed recording, and multi-color recording. Additionally, these advantages can be obtained at a relatively low price to consumers. However, though there has been great improvement in ink-jet printing, accompanying this improvement are increased demands on ink-jet printing, e.g., higher speed, higher resolution, full color image formation, etc.

There are several characteristics to consider when evaluating a printer ink in conjunction with a printing surface or substrate. Such characteristics include (a) edge acuity and optical density of the image on the surface, (b) dry time of the ink on the substrate, (c) adhesion to the substrate, (d) lack of deviation of ink droplets, (e) presence of all dots, (f) resistance of the ink after drying to water and other solvents, (g) long-term storage stability, and (h) long-term reliability without corrosion or nozzle clogging, to name a few. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

Papers used for ink-jet printing have typically included high-quality or wood-free papers designed to have a high ink absorptivity. These papers are functionally good for ink-jet printing in some respects because the ink-jet inks may be absorbed readily and dry quickly. However, such papers often do not allow for a crisp or sharp image. In order to attain enhanced print quality and image quality such as is present in a photograph, specialty media has been developed to work with aqueous inks. For example, various coating techniques are currently being used which employ sol-gel and multi-layer coating systems, producing papers that are designed for use with aqueous ink-jet inks.

Conversely, with commercial offset paper, a nonporous smooth surface can provide a good printing surface for a crisp image. However, commercial offset coated papers are significantly different than office plain papers and photo or glossy papers specifically designed for ink-jet media. Typically, with commercial offset media, the smooth nonporous surface is formed by a coating which requires more time for fluids to penetrate. Because of this, more drying time is required. This is due in part to the diffusion-type adsorption typically required to occur for aqueous inks to dry (as opposed to the capillary-type absorption available for ink penetration of office papers and some ink-jet papers). In many instances, offset coatings contain polymers that are more hydrophobic, e.g., styrene-butadiene based, than paper coatings specifically designed for ink-jet ink, e.g., water-soluble polymers such as polyvinyl alcohol. Thus, because offset coatings are typically hydrophobic, have poor penetration properties, and are smooth/non-porous, offset coatings tend to interact poorly with water-based inks. Further, classic ink-jet solvents such as glycols and diols tend to perform poorly on these coatings, showing long drytimes and poor spreading characteristics. Examples of polymers used in offset media include latex binders, polystyrenes, polyolefins (polypropylene, polyethylene, polybutadiene), polyesters (PET), polyacrylates, polymethacrylates, and/or poly (maleic anhydride).

When using standard aqueous based ink-jet inks, as stated, poor performance on commercial offset media is typically encountered. For example, some dye based color inks penetrate deeply into offset paper and provide poor print quality as well as dull colors (low chroma). Other water-based inks tend to "bloom" or migrate horizontally over long periods of time. Additionally, many pigmented inks tend to dry very slowly, some taking more than 24 hours. In some instances, after 24 hours, the dried print samples remain tacky. Numerous other printing defects can also be present including coalescence, poor black-to-color, color-to-color bleed control, and halo. As a result, many known water-based ink-jet inks are unacceptable when used in conjunction with offset media such as commercial offset paper.

SUMMARY OF THE INVENTION

An aqueous ink-jet ink composition for printing on offset media is disclosed comprising an ink colorant, an effective amount of at least one surfactant, and an effective amount of at least one aprotic polar solvent wherein the solvent is comprised of molecules having a molecular weight from 40 to 1500. Optionally, the ink-jet ink compositions described herein can further comprise an effective amount of a non-aprotic polar solvent. The aprotic polar solvent(s) and the optional non-aprotic polar solvents used can independently have a polarity from 5 to 20 Debye (D).

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

"Aprotic" is used to describe those solvents that do not yield or accept a proton. Typically, aprotic solvents comprise molecules that do not have a hydrogen atom attached to an atom of a strongly electronegative element, e.g., nitrogen and oxygen. Thus, no hydrogen bonding interactions can take place between molecules.

A "surfactant" is a compound that contains a hydrophilic and a hydrophobic segment. Thus, when a surfactant is added to water or some other solvent, the surface tension of the system can be reduced. In general, surfactants can be used for several purposes including wetting, emulsifying, dispersing, foaming, scouring, or lubricating a system.

"Polar" shall include any molecule having a chemical grouping in which the distribution of electrons is uneven or non-symmetrical enabling it to take part in electrostatic interactions. Molecules having high dipole movement greater than water are preferred. More preferred are molecules having a polar value from 5 Debye to 20 Debye.

For purposes of the present invention, "low molecular weight" is intended to include individual molecules in a solvent having molecular weights from 40 to 1500.

"Ink colorant" shall include both dyes and pigments.

"MMC" or "macro-molecular chromophore" refers to pigment particles that have been modified to impart water solubility. After modification, the resulting surface of the MMC consists of carboxylate, phosphate, and/or sulfonate functionalities for anion chromophores, and ammonium, quaternary ammonium, or phosphonium functionalities for cationic chromophores. Thus, the resulting MMC (or pigment particles) that are preferred for use with the present invention, have similar solubility to water soluble acidic and basic dyes.

Aqueous ink-jet inks can be formulated to perform on offset media to an acceptable degree, provided that at least one of a particular class of solvents, and optionally, at least one of a group of surfacants, are combined with the water-based ink-jet ink to be used. Specifically, many standard black and/or color ink-jet inks can be modified to perform in an acceptable manner on offset media, particularly on many commercial offset printer papers. Such inks provide excellent print quality, black-to-color and color-to-color bleed control without significant halo, and no significant coalescence. Further, such inks can dry in a matter of minutes after printing. This is in contrast to typical ink-jet inks that have required hours to dry.

Specifically, in one embodiment, an aqueous ink-jet ink composition for printing on offset media is disclosed comprising an ink colorant, an effective amount of at least one surfactant, and an effective amount of at least one aprotic polar solvent wherein the solvent is comprised of molecules having a molecular weight from 40 to 1500. Optionally, the composition can further be comprised of an effective amount of a non-aprotic polar solvent. If a non-aprotic polar solvent is added, any functional solvent at any functional amount can be used. For example, from 1% to 40% of a non-aprotic polar solvent can be used such as dipropylene glycol.

The aprotic polar solvent can be any polar aprotic solvent that is functional. Generally, polar aprotic solvents dissolve ionic compounds as well as solvate cations. They solvate cations by orienting their negative ends around the cation and by donating unshared electron pairs to vacant orbitals of the cation. Because aprotic solvents cannot form hydrogen bonds and because their positive centers are well shielded from any interaction with anions, aprotic solvents do not solvate anions to any appreciable extent. Thus, with these solvents, anions are unencumbered by a layer of solvent molecules and they are therefore poorly stabilized by salvation. These naked anions are highly reactive both as bases and nucleophiles.

Nucleophility has to do with how well the nucleophile approaches the organic molecule. If the nucleophile is strong, then its ability to minimize any electron repulsion that inevitably takes place will be enhanced. This has a tendency to lower the free energy of activation of the transition state which will make it easier for the product to be formed since the energy barrier is not as great. Strong nucleophiles will react more rapidly than nucleophiles that are described as poor or weak. Negative charged nucleophiles tend to be stronger than the neutral nucleophiles with the same central atom.

Preferred aprotic solvents include amides, sulfoxides, and nitrites, to name a few. Specific preferred aprotic polar solvents include members selected from the group consisting of formamides, methylformamides, methylacetamides, acetonitrile, dimethyl sulfoxide, sulfolane, dimethyl formamide, isopropyl formamide, dibutyl formamide, methyl acetamide, dimethyl acetamide, ethylacetamide, isopropyl acetamide, propanenitrile, dimethyl imidazolidin-2-one, tetramethylurea, cyclohexanone, cyclopentanone, tetrahydrofuran, fluorad, acetyl ethanolamine, methyl propionamide, dimethyl propionamide, isopropyl propionamide, ethyl propionamide, diethyl propionamide, ethyl butanamide, propyl butanamide, butyl butanamide, and combinations thereof. No matter what aprotic polar solvent is used (or combination of polar aprotic solvents), the total amount present is preferably from 5% to 40% by weight.

Though the present invention only requires an effective amount of a surfactant, from 1% to 10% by weight is preferred. Either ionic or non-ionic surfactants can be used, though the use of at least one non-ionic surfactant and a second co-surfactant can provide exceptional results. These surfactants are added to wet the offset paper or other media as well as to improve drytime and spreading. Preferred surfactants that can be used include ethoxylated octylphenols, alkyl phenoxypoly(ethleneoxy)ethanols, silicone glycol copolymers, polyalkylene oxide-modified polydimethylsiloxanes, ethoxlyated tetramethyl decyndiols, secondary alcohol ethoxylates, ethoxylated trimethylnonanols, polyoxyethylene ethers, ethylene oxide/propylene oxide copolymers, fluorosurfactants, and combinations thereof.

When selecting an aprotic polar solvent, it is preferred that the solvent exhibit high dipole movement, or dipole movement greater than that of water. From 5 to 20 Debye (D) is preferred. Additionally, when selecting an ink colorant, either dyes or pigments may be used in effective amounts. If a pigment is used, then macromolecular chromophores (MMCs) are preferred. However, the use of from 2% to 6% by weight of total ink colorant is preferred. This range can be a single colorant or a combination of colorants, e.g., multiple dyes or multiple pigments.

EXAMPLES

The following examples illustrate the preferred embodiments of the invention that are presently best known.

However, other embodiments can be practiced that are also within the scope of the present invention.

Example 1

A pipette which creates 10:L drops was used to place various aprotic polar amides onto an offset coated paper surface. After the drop was placed on the paper, the initial wetting/spreading and dry time were measured visually (See Table 1). Additionally, the initial dot size and the final dot size were also measured visually (See Table 2). With regard to the dry time, this was determined by measuring the amount of time required from when the drop was placed onto the media to when all the fluid was visibly gone from the media surface, i.e., by penetration and/or evaporation. The three offset coated papers used were Lustro Laser Gloss (from S. D. Warren), Kromecote (from Champion papers), and Utopia Dull (from Appleton papers). All measurements were conducted at ambient conditions. Below, "poor" defines unacceptable wetting, "marg" defines marginally acceptable wetting, and "good" defines acceptable wetting.

TABLE 1

| | INITIAL WETTING | | | DRY TIME (min) | | |
|---|---|---|---|---|---|---|
| SOLVENT | UTOPIA | LUSTRO | KROMECOTE | UTOPIA | LUSTRO | KROMCOTE |
| DI Water | poor | poor | poor | 31 | 16 | 36 |
| Acetonitrile | exc | exc | exc | <1 | <1 | <1 |
| Formamide | poor | marg/poor | poor | 65 | 19 | >270 |
| N-Methyl formamide | good | marg/good | marg | 9 | 13 | 28 |
| Dimethyl formamide | good | good | exc | 5 | 5 | 8 |
| Isopropyl formamide | exc | marg | exc | 13 | 46 | 4 |
| Dibutyl formamide | good | marg | good | 23 | >60 | 19 |
| Methyl acetamide | exc | marg | marg | 11 | 52 | 60 |
| Dimethyl acetamide | exc | good | exc | 7 | 14 | 12 |
| Ethyl acetamide | exc | marg | exc | 8 | 49 | 5 |
| Acetyl ethanolamine | poor | poor | poor | >60 | >60 | >40 |
| Isopropyl acetamide | exc | marg | good | 47 | N/A | 21 |
| N-Methyl propionamide | exc | marg | good | 6 | 44 | 13 |
| Dimethyl propionamide | exc | good | good | 4 | 23 | 10 |
| Isopropyl propionamide | good | marg | marg | N/A | N/A | 40 |
| Ethyl propionamide | exc | marg | good | 16 | 47 | 18 |
| Diethyl propionamide | exc | marg/good | good | 14 | 66 | 20 |
| Ethyl butanamide | good | marg | marg | >60 | >60 | 62 |
| Propyl butanamide | good | marg | marg | >60 | >60 | 58 |
| Butyl butanamide | good | marg | marg | 67 | >60 | 32 |

TABLE 2

| | INITIAL DOT SIZE (cm) | | | FINAL DOT SIZE (cm) | | |
|---|---|---|---|---|---|---|
| SOLVENT | UTOPIA | LUSTRO | KROMECOTE | UTOPIA | LUSTRO | KROMCOTE |
| DI Water | 0.3 | 0.3 | 0.4 | 0.7 | 0.7 | 0.5 |
| Acetonitrile | 1 | 0.8 | >1 | N/A | 1 | >1 |
| Formamide | 0.4 | 0.5 | 0.4 | 0.9 | 1 | 1 |
| N-Methyl formamide | 0.7 | 0.7 | 0.6 | 0.9 | 1 | 1 |
| Dimethyl formamide | 1 | 0.9 | 1 | 1 | 1 | 1 |
| Isopropyl formamide | 1.1 | 0.5 | >1 | 2.1 | 1.6 | 1.5 |
| Dibutylformamide | 1 | 0.5 | 0.8 | 1.5 | 1.6 | 1 |
| Methyl acetamide | 1.1 | 0.5 | 0.5 | 1.7 | 1.3 | 1.0 |
| Dimethyl acetamide | 1.1 | 0.8 | >1 | 1.5 | 1 | 1.2 |

TABLE 2-continued

| | INITIAL DOT SIZE (cm) | | | FINAL DOT SIZE (cm) | | |
|---|---|---|---|---|---|---|
| SOLVENT | UTOPIA | LUSTRO | KROMECOTE | UTOPIA | LUSTRO | KROMCOTE |
| Ethyl acetamide | 1.1 | 0.5 | 1.1 | 1.6 | 1.5 | 1.5 |
| Acetyl ethanolamine | 0.3 | 0.3 | 0.3 | 0.6 | 0.5 | 0.3 |
| Isopropyl acetamide | 1.1 | 0.5 | 1 | 2 | N/A | 1.2 |
| N-Methyl propionamide | >1.3 | 0.6 | 1 | 1.5 | 1.5 | 1.3 |
| Dimethyl propionamide | 1.3 | 1 | 0.8 | 1.7 | 1.5 | 1.2 |
| Isopropyl propionamide | 0.8 | 0.5 | 0.8 | >8 | 0.5 | 1.2 |
| Ethyl propionamide | 1.1 | 0.5 | 0.8 | 2.1 | 1.4 | 1.4 |
| Diethyl propionamide | 1 | 0.7 | 0.9 | 1.7 | 1.3 | 1.3 |
| Ethyl butanamide | 1 | 0.5 | 0.8 | 1.1 | 0.9 | 1 |
| Propyl butanamide | 1 | 0.5 | 0.8 | 1.8 | 1.2 | 1.5 |
| Butyl butanamide | 1 | 0.5 | 0.8 | 2.1 | 1.2 | 1.5 |

Using this data, several ink-jet ink formulations have been made that are functional for printing on commercial offset coated media. Specifically, with the use of low molecular weight polar aprotic solvents, several water soluble dye- and pigment-based inks have been prepared which perform well on offset media as disclosed in Examples 2 to 7.

Example 2

An ink-jet ink formulation is prepared by mixing about 2.5% of pigment red 122, 7.5% sulfolane, 5% acetonitrile, and 5% Tergitol™ 15-s-12, and 80% water, each by weight. Such a formulation results in a red ink-jet ink that prints on commercial offset printer paper with excellent print quality, no halo, insignificant coalescence, and relatively quick dry time.

Example 3

An ink-jet ink formulation is prepared by mixing about 6% of pigment violet 19, 1% sulfolane, 5% acetonitrile, and 1% Tergitol™ 15-s-9, and 87% water, each by weight. Such a formulation results in an ink-jet ink that prints on various commercial offset printer paper with good print quality, insignificant halo and coalescence, and relatively quick dry time.

Example 4

An ink-jet ink formulation is prepared by mixing about 3% of acid blue 9, 5% acetonitrile, 10% Tergitol™ 15-s-5, and 82% water, each by weight. Such a formulation results in a blue ink-jet ink that prints on various brands of commercial offset printer paper with good print quality, no halo, insignificant coalescence, and relatively quick dry time.

Example 5

An ink-jet ink was prepared by mixing the following ingredients by weight: 25% N-ethyl acetamide, 10% dipropylene glycol, 5% Tergitol™ 15-s-5, 1.7% Projet™ cyan (Na salt form), 0.6% acid blue 9 (Na salt form) and the balance in deionized water.

Example 6

An ink-jet ink was prepared by mixing the following ingredients by weight: 25% N-ethyl acetamide, 10% dipropylene glycol, 5% Tergitol™ 15-s-5, 2.5% Projet yellow 1G, 0.9% acid yellow 23 (TMA salt form), and the balance in deionized water.

Example 7

Inks from examples 4–6 were jetted from an HP2000C printer onto various offset coated papers. Specifically, LUSTRO™ Laser gloss (from S. D. Warren), PRODUCTOLITH™ (from Consolidated Papers), MAGNO™ (from SAPPI), UTOPIA™ Dull (from Appleton Papers), and HP Brochure and Flyer paper, two-sided gloss (p/n# C6817A) were used. Drytime measurements were conducted at ambient conditions.

The procedures followed in the dry time testing were as follows: first, solid bar patterns were printed on each paper sample using the inks from Examples 4–6. The approximate size of each bar was about 0.25 inches by x8 inches for each color. A standard ink-jet ink typically used in an HP2000C printer was also tested as a comparison for the dry time test. The black ink was not evaluated for this test. Each plot was printed using the "Premium Ink-jet Media—Normal" print mode, which prints the plot within approximately 45 seconds (for this pattern, the ink density is approximately 128 picoliters/300 dots/inch pixel for the red, green, & blue bars). After the plot was completed, 10 sheets of the same type of coated media were placed upon the solid bar pattern immediately after printing. After a few minutes, the blanks sheets were removed and the sheet that was in contact with the print bars was examined for color ink transfer. Less ink transfer indicates faster drying of the ink. The table below summarizes the amount of ink transfer that occurred with respect to each ink tested. The value in percentage (%) indicates the approximate amount of area fill transferred to the blotted sheet.

TABLE 3

| MEDIA | CONTROL INKS (standard HP2000C inks) | INKS FROM EXAMPLES 7–9 |
|---|---|---|
| HP Brochure media | Very small (1%) | Very small (1%) |
| Lustro | Very significant (40%) | Very small (1%) |
| Utopia | Very significant (40%) | Small (5%) |
| Magno | Very significant (40%) | Noticeable (20%) |
| Productolith | Significant (30%) | Very small (1%) |

As shown in Table 3 above, the inks from Examples 4–6 show significant improvement for drying performance than the control inks.

To illustrate that the ink-jet inks of the present invention are particularly good with respect to use with commercial offset papers, both the control ink and the inks of Examples 4–6 were printed on Weyshauser Recycled Laser Copy office paper using the "Plain Paper—Normal" print mode. Both inks showed good print quality and similar edge acuity.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

We claim:

1. An aqueous ink-jet ink composition for printing on offset media comprising:
   a) an ink colorant;
   b) at least one surfactant; and
   c) at least one aprotic polar solvent wherein the solvent is comprised of molecules having a molecular weight from 40 to 1500, said composition being configured to be ink-jetted on offset media to form an image without substantial coalescence.

2. An aqueous ink-jet ink composition as in claim 1 further comprising a non-aprotic polar solvent.

3. An aqueous ink-jet ink composition as in claim 1 wherein the aprotic polar solvent is an amide.

4. An aqueous ink-jet ink composition as in claim 1 wherein the aprotic polar solvent is selected from the group consisting of formamides, methylformamides, methylacetamides, acetonitrile, dimethyl sulfoxide, sulfolane, dimethyl formamide, isopropyl formamide, dibutyl formamide, methyl acetamide, dimethyl acetamide, ethylacetamide, isopropyl acetamide, propanenitrile, dimethyl imidazolidin-2-one, tetramethylurea, cyclohexanone, cyclopentanone, tetrahydrofuran, fluorad, acetyl ethanolamine, methyl propionamide, dimethyl propionamide, isopropyl propionamide, ethyl propionamide, diethyl propionamide, ethyl butanamide, propyl butanamide, butyl butanamide, and combinations thereof.

5. An aqueous ink-jet ink composition as in claim 1 wherein the aprotic polar solvent is present at from 5% to 40% by weight.

6. An aqueous ink-jet ink composition as in claim 1 wherein the surfactant is present at from 1% to 10% by weight.

7. An aqueous ink-jet ink composition as in claim 6 wherein the surfactant is an ionic surfactant.

8. An aqueous ink-jet ink composition as in claim 6 wherein the surfactant is a non-ionic surfactant.

9. An aqueous ink-jet ink composition as in claim 6 wherein the surfactant is selected from the group consisting of ethoxylated octylphenols, alkyl phenoxypoly(ethleneoxy) ethanols, silicone glycol copolymers, polyalkylene oxide-modified polydimethylsiloxanes, ethoxlyated tetramethyl decyndiols, secondary alcohol ethoxylates, ethoxylated trimethylnonanols, polyoxyethylene ethers, ethylene oxide/propylene oxide copolymers, fluorosurfactants, and combinations thereof.

10. An aqueous ink-jet ink composition as in claim 1 further comprising a second co-surfactant.

11. An aqueous ink-jet ink composition as in claim 1 wherein the aprotic polar solvent is from 5 to 20 Debye (D).

12. An aqueous ink-jet ink composition as in claim 1 wherein the ink colorant is one or more dyes wherein the total amount of dye present is from 2% to 6% by weight.

13. An aqueous ink-jet ink composition as in claim 1 wherein the ink colorant is one or more pigments wherein the total amount of pigment present is from 2% to 6% by weight.

14. An aqueous ink-jet ink composition as in claim 1 wherein the ink colorant is one or more macro-molecular chromophore wherein the total amount of macro-molecular chromophore present is from 2% to 6% by weight.

15. An aqueous ink-jet ink composition as in claim 1 having two aprotic polar solvents present in the composition.

16. An aqueous ink-jet ink composition for printing on offset media comprising:
   a) from 2% to 6% of an ink colorant by weight;
   b) from 1% to 10% of surfactant;
   c) from 5% to 40% of aprotic polar solvent comprised of molecules having molecular weights from 40 to 1500; and
   d) from 1% to 40% of non-aprotic polar solvent comprised of molecules having molecular weights from 40 to 1500, said composition being configured to be ink-jetted on offset media to form an image without substantial coalescence.

17. An aqueous ink-jet ink composition as in claim 16 wherein the surfactant is a non-ionic surfactant.

18. An aqueous ink-jet ink composition as in claim 16 wherein the aprotic polar solvent has a polarity value from 5 to 20 Debye (D).

19. An aqueous ink-jet ink composition as in claim 16 wherein the ink colorant is comprised of macro-molecular chromophores.

20. An aqueous ink-jet system for printing on offset media comprising:
   a) coated offset media; and
   b) an aqueous ink-jet ink composition including:
      i) at least one ink colorant;
      ii) at least one surfactant; and
      iii) at least one aprotic polar solvent wherein the solvent is comprised of molecules having a molecular weight from 40 to 1500, said composition being configured to be ink-jetted on the offset media to form an image.

21. An aqueous ink-jet system as in claim 20 wherein the aqueous ink-jet ink composition further comprises a non-aprotic polar solvent.

22. An aqueous ink-jet system as in claim 20 wherein the aprotic polar solvent is selected from the group consisting of formamides, methylformamides, methylacetamides, acetonitrile, dimethyl sulfoxide, sulfolane, dimethyl formamide, isopropyl formamide, dibutyl formamide, methyl acetamide, dimethyl acetamide, ethylacetamide, isopropyl acetamide, propanenitrile, dimethyl imidazolidin-2-one, tetramethylurea, cyclohexanone, cyclopentanone, tetrahydrofuran, fluorad, acetyl ethanolamine, methyl propionamide, dimethyl propionamide, isopropyl propionamide, ethyl propionamide, diethyl propionamide, ethyl butanamide, propyl butanamide, butyl butanamide, and combinations thereof.

23. An aqueous ink-jet system as in claim 20 wherein the composition includes the aprotic polar solvent at from 5% to 40% by weight, the surfactant at from 1% to 10% by weight, and the ink colorant at from 2% to 6% by weight.

24. An aqueous ink-jet system as in claim 20 wherein the ink colorant is selected from the group consisting of a dye, a pigment, a macro-molecular chromophore, and combinations thereof.

* * * * *